June 10, 1969 B. E. ENSSLE 3,448,961
VALVE
Filed July 8, 1965
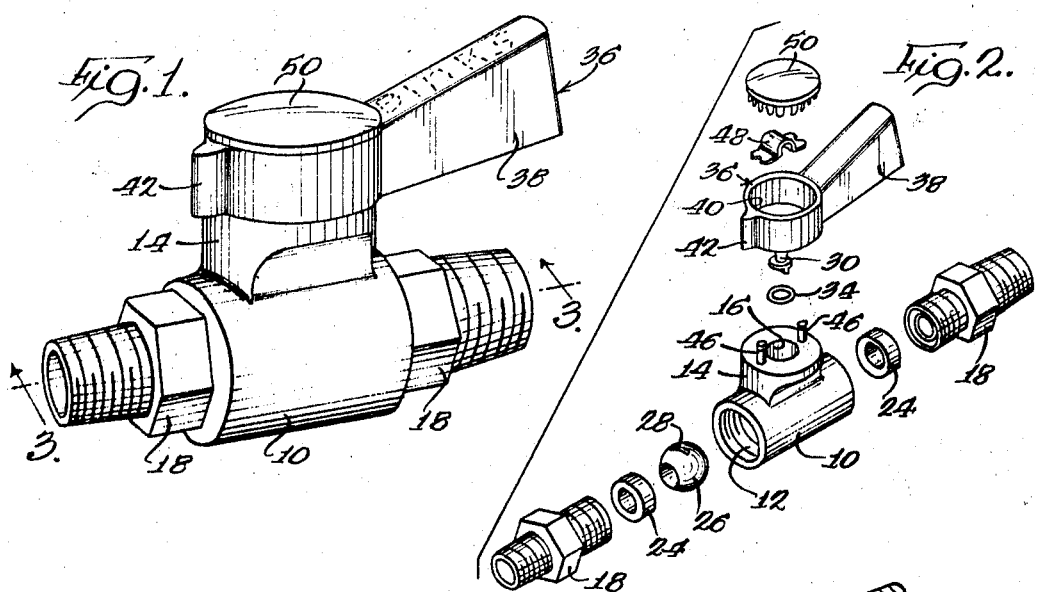
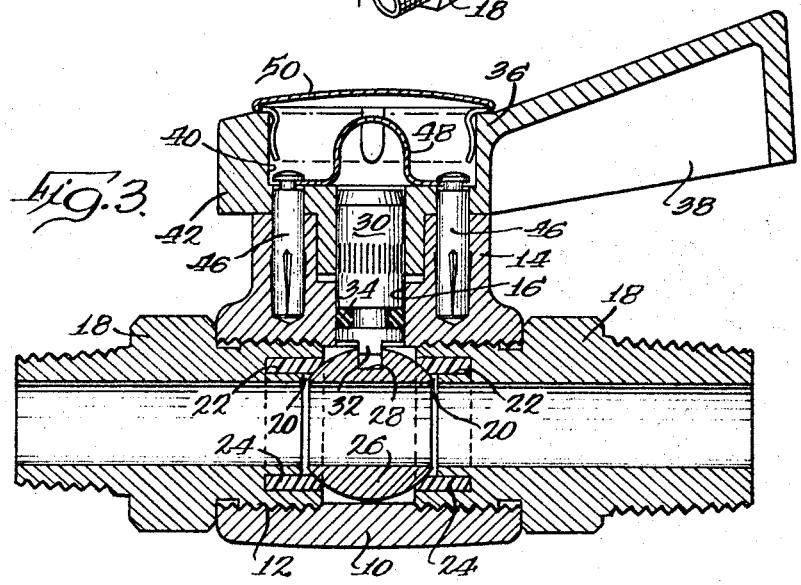
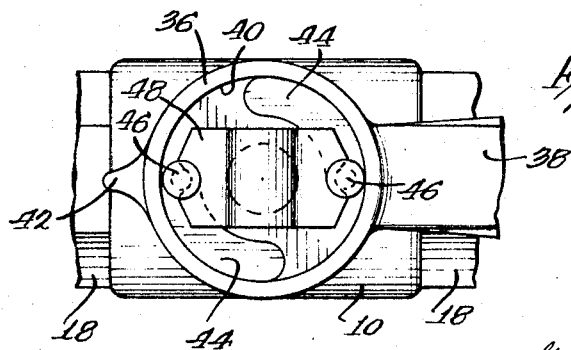
INVENTOR.
Bruno E. Enssle
BY
Gary, Parker, Juettner & Cullinan
Attys United States Patent Office 3,448,961
Patented June 10, 1969

3,448,961
VALVE
Bruno E. Enssle, Boulder, Colo., assignor, by mesne assignments, to Binks Research and Development Corporation, Boulder, Colo., a corporation of Colorado
Filed July 8, 1965, Ser. No. 470,517
Int. Cl. F16k 51/00
U.S. Cl. 251—288       3 Claims

ABSTRACT OF THE DISCLOSURE

A ball valve characterized in the first instance by a body receiving a valve ball and a pair of integral fittings, each fitting having a recess for receiving a tubular fluorocarbon seal in such manner that the confined volume of the seal greatly exceeds the unconfined volume of the seal and the outer peripheral surface of the seal is supported throughout its length, each fitting also having a flange engaging the body and thereby determining the compressive force applied to the seal. Secondly, the ball valve is characterized by a limit stop and handle arrangement so constructed that the handle will indicate the on-off condition of the valve; the handle being reversibly mounted on the valve stem so that it will also indicate the direction of fluid flow through the valve.

---

The present invention relates to valves for controlling fluid flow, and particularly, to an improved ball valve for controlling flow of gasses and liquids under both low pressures and high pressures.

The object of the invention is to provide an improved economical construction for ball valves facilitating economical manufacture of the valves, convenient fabrication of valves to satisfy varying field conditions, and convenient identification of the fluid controlled by the valve and the position of the valve.

Another object of the invention is the provision of a ball valve embodying improved sealing means for the ball.

Other objects and advantages of the invention will become apparent in the following detailed description.

Now, in order to acquaint those skilled in the art with the manner of making and using the improved ball valve of this invention, there shall be described, in connection with the accompanying drawings, a preferred embodiment of the valve and preferred manners of making and using the same.

In the drawings:

FIGURE 1 is a perspective view of a preferred embodiment of the ball valve of the invention;

FIGURE 2 is an exploded perspective view of the valve illustrating the individual components thereof;

FIGURE 3 is a vertical longitudinal section of the valve; and

FIGURE 4 is a fragmentary plan view of the valve with the handle cap thereof removed to reveal the connection between the valve handle and the valve body.

Referring to the drawings, the valve is illustrated as comprising a valve body 10 having a longitudinal bore 12 defining a fluid passage therethrough. A boss 14 extends radially from the bored portion of the body and has formed therein a secondary bore 16 communicating radially with the center of the bore 12.

Removably inserted in the opposite ends of the bore 12, preferably by threaded connections, are a pair of fittings 18. A particular feature of the valve is the interchangeability of fittings to provide, on order or to satisfy various field conditions, straight or tapered male or female fittings of a variety of sizes as may be required at each end of the valve body. Thus, while tapered male threads of two different sizes have been shown in the drawing as formed on the outer ends of the fittings 18, it is to be appreciated that said outer ends may take other forms as desired or required. Irrespective of the external thread portion thereof, each fitting includes a threaded male inner end portion, preferably of straight thread configuration. At the inner end face thereof, each fitting is formed with a counterbore 20 and an annular recess 22 concentric and communicating with the counterbore.

Removably inserted in each recess 22 and extending into the respective counterbore 20 is a tubular sealing member 24, preferably formed of polytetrafluorethylene, nylon or the like. By virtue of the fact that this tubular sealing element is encased and retained in the counterbore 20 and the recess 22, the same is fully reinforced against cold flow and/or excessive deformation and thus has imparted to it a long and efficacious service life. In particular, the outer peripheral surface of each seal is substantially fully supported by the outer wall of the recess 22 and counterbore 20, and the majority of the inner peripheral surface is supported by the inner wall of the recess. Thus, the confined volume of the seal substantially exceeds the free or unconfined volume of the seal, and this is especially desirable with fluorohydrocarbon seal materials. The confined volume is maintained sufficiently high to sustain stresses without exceeding the modulus of elasticity of the seal material, but not so high as to suffer excessive stress dissipation or excessively slow elastic return. In the illustrated embodiment of my valve, utilizing polytetrafluoroethylene seals, the ratio of the confined volume to the free volume of each seal is preferably about three to one.

Rotatably confined in the fluid passage by the two fittings 18 is a valve ball 26 which is compressively and sealingly engaged at its opposite sides by the two tubular seals 24. The ball is provided in the peripheral wall thereof with a slot 28 which is preferably set at right angles to the bore through the ball so as to establish a definite correlation between the two, the slot 28 being aligned with the transverse bore 16 in the body.

Rotatably and slidably mounted in the bore 16 is a valve stem 30 including a tongue 32 complementary to and enterable in the slot 28 to interconnect the ball and the stem for conjoint rotation. A peripheral groove in the stem receives an O-ring seal 34, thereby to seal the stem in the valve body.

The body 10 is preferably provided with a counterbore concentric with and forming part of the bore 16, into which the stem 30 extends. Rotatably mounted in this counterbore is a reduced tubular portion of a handle 36, the handle preferably being fixedly secured to the stem 30, as by a press-fitted connection therebetween, and including a hand grip portion 38 extending at right angles to the tongue 32 of the stem, whereby the hand grip extends parallel to the bore through the valve ball.

Interconnecting the tubular stem engaging portion and the hand grip of the handle is a body portion defining an upwardly open pocket 40 and an arrow 42 extending oppositely of the hand grip 38. The bottom wall of the pocket 40, as shown in FIGURES 3 and 4, is provided at diametrically opposite portions thereof with a pair of arcuate slots 44 each of an arcuate extent of substantially 90° and each having one end thereof aligned with the hand grip 38 and the arrow 42. Disposed within the pocket 40 are connection means for detachably mounting the handle on the valve body, such means including a pair of pins 46 extending respectively through said slots 44 and aligned with the bore or fluid passage 12 through the body. The pins and slots thus limit the handle to a 90° arc of swing and define a full open limit of valve movement wherein the hand grip 38 and arrow 42 are aligned with the passage 12, and a fully closed limit of valve movement wherein the hand grip extends at right angles to the passage 12 and the body 10 of the valve. The handle may be reversely mounted on the valve body without changing this relationship, whereby the hand grip and arrow may be utilized to indicate the direction of fluid flow through the body.

In the illustrated embodiment of the invention, the handle has a quick detachable connection with the valve body characterized by a pair of headed pins 46 pressed into the valve body and a flexible spring 48 detachably engageable beneath the heads of the pins and engaging the bottom wall of the pocket 40 to connect the handle to the pins. While a bowed spring having slotted ends has been illustrated in the drawings, it will be apparent that other forms of springs may be used for the purpose. Thus, to reverse the handle on the body for purposes of indicating the direction of fluid flow through the body, it is only necessary to squeeze the spring 48 to release it from the pins 46, reverse the handle, and reapply the spring.

To close the handle pocket containing the connection means 46–48, a cap 50 having a depending spring flange is removably pressed into the open upward end of the pocket. The cap of course accommodates access to the spring 48 and also trims off the upper face of the handle for an aesthetically desirable appearance. In addition, the removble cap 50 affords the advantage that caps of different colors or other codings may be utilized on respective valves to indicate the type of fluid flowing through the valve, i.e., air, gas, liquid, etc.

Thus, all of the objects and advantages of the invention have been shown herein to be attained in a convenient, economical and practical manner.

What is claimed is:

1. In a ball valve, a body including a fluid passage, a valve ball rotatable in said passage, an integral fitting removably inserted in each end of said passage, each fitting having an annular recess in the end face thereof inserted in said passage, and a tubular plastic seal in each of said recesses having end faces sealingly engaging axially against the opposite sides of said valve ball, each said recess having an outer peripheral wall supporting the full length of the outer peripheral wall of the respective seal and an inner peripheral wall having an end face that is axially spaced from said valve ball when said integral fitting is fully inserted in said passage with said inner peripheral wall supporting the major portion of the length of the inner peripheral wall of the respective seal and confining a portion of the seal having a volume substantially in excess of the volume of the unconfined portion of the seal, each of said fittings including an integral flange engaged with said body for defining the extent of entry of the fitting into the body and determining the compressive force applied to the respective seal.

2. In a ball valve, a body including a fluid passage, a valve ball rotatable in said passage, an integral fitting removably inserted in each end of said passage, each fitting having a counter-bore receiving part of the valve ball and an annular recess surrounding said counter-bore, and tubular fluorocarbon seals removably inserted in said recesses having end faces extending into the respective counterbores and sealingly engaging axially against the opposite sides of said valve ball, each said counterbore and recess having an outer peripheral wall supporting the outer peripheral wall of the respective seal throughout its full length, each recess having an inner peripheral wall having an end face that is axially spaced from said valve ball when said integral fitting is fully inserted in said passage with said inner peripheral wall supporting the inner peripheral wall of the respective seal throughout the major portion of its length, each said counterbore and recess confining a portion of the respective seal having a volume of about three times the volume of the unconfined portion of the seal, each of said fittings including an integral flange engaged with said body for defining the extent of entry of the fitting into the body and determining the compressive force applied to the respective seal.

3. In a ball valve, a valve body, a fluid passage in the body, a valve ball rotatable in the passage, a valve stem slidably and rotatably mounted in said body, said stem and valve ball having complementary tongue and slot portions detachably connecting the two for conjoint rotation, a handle connected to said stem for rotating said ball, said handle comprising a handle body engaged with said stem and including an arcuate slot concentric with said stem, connector means including pin means extending through said slot in said handle body into said valve body for detachably connecting the handle to the valve body, and a hand grip on said handle body, said slot being of about 90° arcuate extent and said slot and said pin means being so arranged with respect to one another and said hand grip as to align the hand grip with said passage when the valve is fully open and to dispose the same at right angles to said passage when the valve is fully closed, said handle being reversibly attachable to the body to indicate the direction of fluid flow through the valve, said handle body including an upwardly open pocket concentric with said stem, said arcuate slot being formed in the bottom wall of said pocket, spring means in said pocket in said handle body detachably engaged with said pin means for detachably retaining said handle on said body, and a removable closure cap for said pocket.

References Cited

UNITED STATES PATENTS 3,209,779   10/1965   McGowen _____ 251—283 X

FOREIGN PATENTS 936,182   9/1963   Great Britain.

M. CARY NELSON, *Primary Examiner.*

ROBERT C. MILLER, *Assistant Examiner.*

U.S. Cl. X.R.

251—315